(No Model.)
T. R. WHEELER.
WAGON BRAKE.
No. 354,756. Patented Dec. 21, 1886.
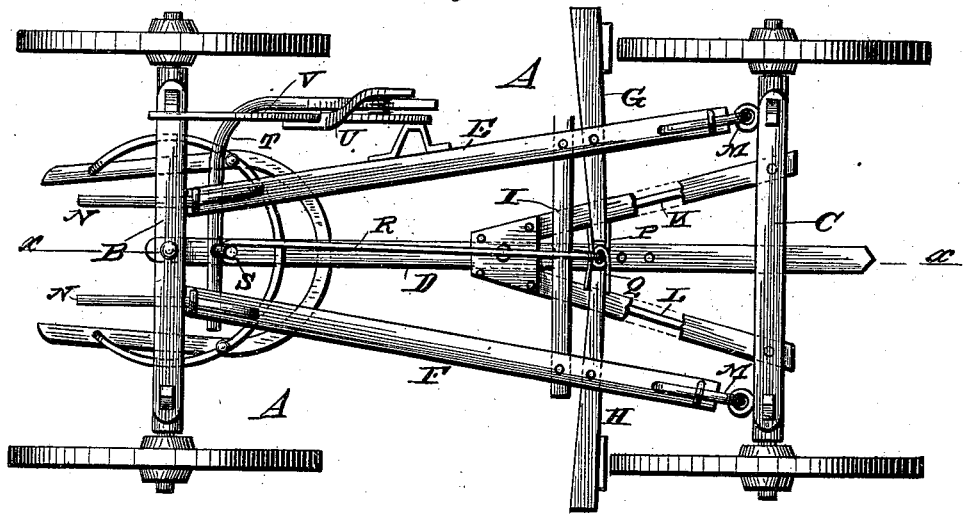
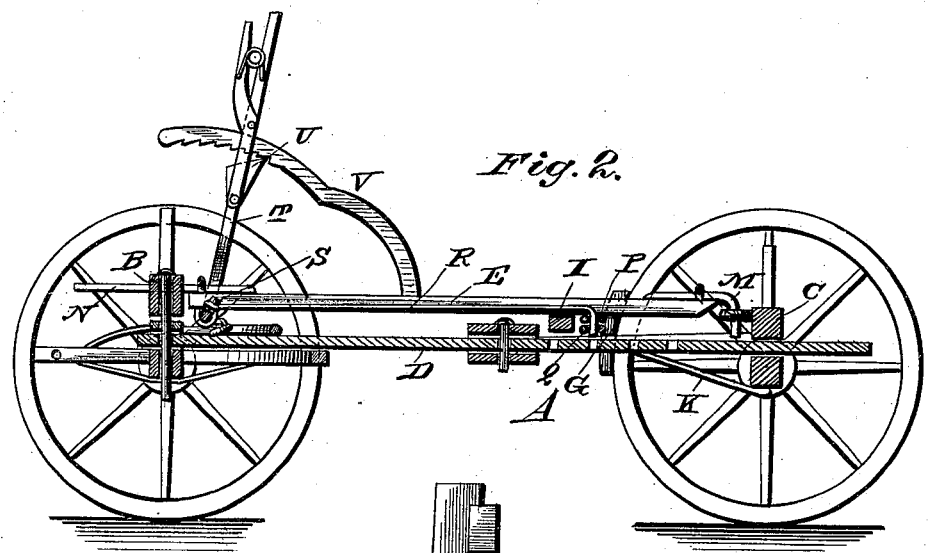
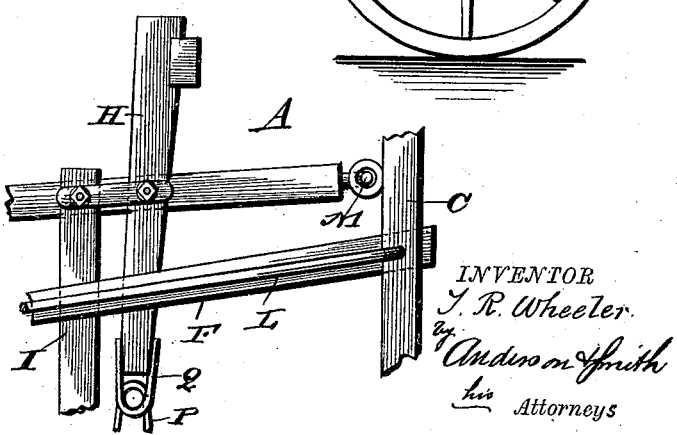
WITNESSES
B. Fugitt
P. C. Masi
INVENTOR
T. R. Wheeler
by Anderson & Smith
his Attorneys

UNITED STATES PATENT OFFICE.

THADDEUS R. WHEELER, OF CANANDAIGUA, NEW YORK.

WAGON-BRAKE.

SPECIFICATION forming part of Letters Patent No. 354,756, dated December 21, 1886.

Application filed October 8, 1886. Serial No. 215,686. (No model.)

*To all whom it may concern:*

Be it known that I, THADDEUS R. WHEELER, a citizen of the United States, and a resident of Canandaigua, in the county of Ontario and State of New York, have invented certain new and useful Improvements in Wagon-Brakes; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a plan view. Fig. 2 is a vertical section on the line $x$ $x$, Fig. 1. Fig. 3 is an enlarged detail view.

My invention relates to wagon-brakes; and it consists in the construction and novel combination of parts, as hereinafter described, and pointed out in the claim.

Referring by letter to the accompanying drawings, A designates the running-gear of a wagon of ordinary construction, in which B is the front bolster, C the rear bolster, and D the reach.

E and F designate two side bars, which are connected in front of the pivoted brake-bars G H by a transverse bar, I, which is secured at its ends to the lower faces of said side bars by bolts. The pivoted brake-bars G H are also secured to the lower faces of the side bars, E F, and brace-rods K L secured at their ends to the lower faces of the side bars, E F, and serve to strengthen the structure. The rear ends of the side bars, E F, are provided with hooks M, which hook over the ends of the rear bolster, C, just outside of the stakes, while at their front ends the side bars, E F, are provided with parallel iron rods N, which extend forwardly therefrom and rest in seats either in said front bolster or in seats in a bar or strip rested on said bolster, as the builder or owner may elect.

The brake-bars G H are provided in their rear edges near their outer ends with brake-shoes of any desired construction. At their inner ends the brake-bars are provided with staple-irons P Q, which are engaged by the rear end of the brake-rod R, the front end of said brake-rod being hinged to a short arm, S, of the cranked rod T. The crank-rod T is journaled in bearings near the front ends of the side bars, E F, having a spring-detent, U, which engages an outwardly-curved forwardly-projecting rack, V, and holds the brakes in either the locked or unlocked position, as may be desired.

The parallel rods N project in front of the front bolster, and also extend some distance to the rear of said bolster, in order to make provision for shortening or lengthening the reach when necessary.

Having described this invention, what I claim, and desire to secure by Letters Patent, is—

The combination, with the connected side bars provided with hooks at their rear ends and parallel rods at their front ends, of the pivoted brake-bars secured to said side bars, and the brake-rod connected at its rear end to the brake-bars, and at its front end to a crank-rod provided with a lever adapted to engage a rack-bar on one of the side bars, substantially as specified.

In testimony whereof I affix my signature in presence of two witnesses.

THADDEUS R. WHEELER.

Witnesses:
    E. C. CHURCH,
    M. N. CLEMENT.